Aug. 12, 1969 M. J. KELLY ET AL 3,461,439

REUSABLE DATA PLANES FOR SOLENOID ARRAY MEMORY SYSTEMS

Filed May 6, 1966 2 Sheets-Sheet 1

INVENTORS
MICHAEL J. KELLY
BERNARD J. REKIERE

BY

ATTY.

United States Patent Office 3,461,439
Patented Aug. 12, 1969

3,461,439

REUSABLE DATA PLANES FOR SOLENOID ARRAY MEMORY SYSTEMS

Michael J. Kelly, Melrose Park, and Bernard J. Rekiere, Addison, Ill., assignors to Automatic Electric Laboratories, Inc., Northlake, Ill., a corporation of Delaware Filed May 6, 1966, Ser. No. 548,110
Int. Cl. G11c 7/00; H05k 3/04
U.S. Cl. 340—174 3 Claims

ABSTRACT OF THE DISCLOSURE

Each data plane for a solenoid array memory system has a major substrate upon which are placed coding strips for each address and word. The major substrate has permanent, interconnecting, printed circuit portions, and the coding strips have alterable conductive portions in contact with the permanent interconnection portions to complete loops about solenoids. The direction of current flow through each of the loops is dependent upon the coding strips. Read-out information is changed by changing data planes. After old information is no longer required on a data plane, its coding strips are removed, and new coding strips for new information are applied so that economical benefits of reuse can be obtained.

This invention relates to mechanically alterable memory systems and more particularly to improved reusable data planes for use in solenoid array memory systems.

A mechanically alterable solenoid array memory system is described by J. M. Donnelly, K. E. Larabee and B. J. Rekiere in copending patent application Ser. No. 379,941, filed July 2, 1964, and assigned to the same assignee as the present invention, wherein a data store comprises a plurality of data planes, each having a plurality of aligned apertures therein, and a plurality of elongated solenoids, each of which extends through respective aligned ones of said apertures. Each data plane comprises two portions, a driving portion and a storage portion. Likewise, the solenoids are grouped into two categories, drive solenoids and sense solenoids. A plurality of single turn printed loops, hereinafter called minor loops, are carried on each data plane. On the storage portion of a data plane the minor loops are arranged to encircle in signal transfer relationship respective ones of said sense solenoids in one direction or the other. On the drive portion of a data plane, a single minor loop encircles a unique one of said drive solenoids in signal transfer relationship; therefore, the number of data planes is equal to the number of drive solenoids. The single drive minor loop is serially connected with the plurality of data storage minor loops to form a major loop. Those storage loops which encircle their corresponding sense solenoids in a first direction represent a ONE and those sense loops which encircle their corresponding solenoids in the opposite direction represent a ZERO. To read data from a particular data plane, the drive solenoid which corresponds to that plane is energized and acts as a transformer primary to its associated drive minor loop which acts as a secondary and establishes a current flow through the serially connected major loop. Each storage loop which is a part of the major loop acts as a primary winding to its corresponding sense solenoid. The signal sensed by the sense solenoids have a polarity dependent on the direction of encirclement and represent the ONES and ZEROS of the stored data.

Other investigations in the data plane area have provided data planes which carry their own address by means of the above alternate encirclement technique. The drive or address loops of this type of data plane are serially connected with the data storage loops by means of a diode. The address code of each plane is arranged so that only one plane of a plurality has a net induced positive signal which will forward bias said diode and establish a current flow in the major loop. The net induced signal in all other data planes is null or negative.

A further improvement in the above type of data plane includes a transistor between the address and storage portions of the plane to provide an address major loop including the base-emitter circuit of the transistor, and a storage major loop including the collector-emitter circuit of the transistor. This configuration, along with an additional drive solenoid in the storage major loop, provides for a greater current flow through the storage minor loops than was possible before.

The above data planes have a common advantage in that no physical connection to the remainder of the system is required. Data may be changed by removing a plane from the solenoid array and replacing the plane with one having different information content. However, unless the data content of a removed plane is to be saved for future use, and at the same address, the removed plane is useless, and is usually discarded. This adds to the operating cost of the memory system. Further costs are incurred in the case of the latter-mentioned data planes if the semiconductor components are discarded with the plane, or if a salvage operation is required to save such components. It is therefore the primary object of the present invention to provide new and improved reusuable data plane arrangements for solenoid array memory systems.

Since solenoid array memory systems are generally arranged so that a row of sense solenoids correspond to a data word, it is another object of the invention to provide improved reusuable data planes the information content of which may be altered on a word basis.

Through the above objects, it is a further object of the invention to reduce the operating costs of solenoid array memory systems.

Heretofore, data planes were produced as master sheets comprising a flexible substrate, such as Mylar, and carrying a printed conductor, usually copper, the minor loops of which completely encircle the solenoid accepting apertures. The master sheets are encoded by scraping away or punching out a portion of the minor loops on either side of the apertures. According to the present invention, a master sheet also comprises a flexible substrate; however, the printed conductor carried thereon is not continuous in the areas of the solenoid accepting apertures. Code strips which carry conductive patterns thereon are removably affixed to the data planes to provide the stored data.

Other objects and features of the invention will become apparent and the invention will be better understood from the following description taken in conjunction with the accompanying drawing, in which.

Figure 1:
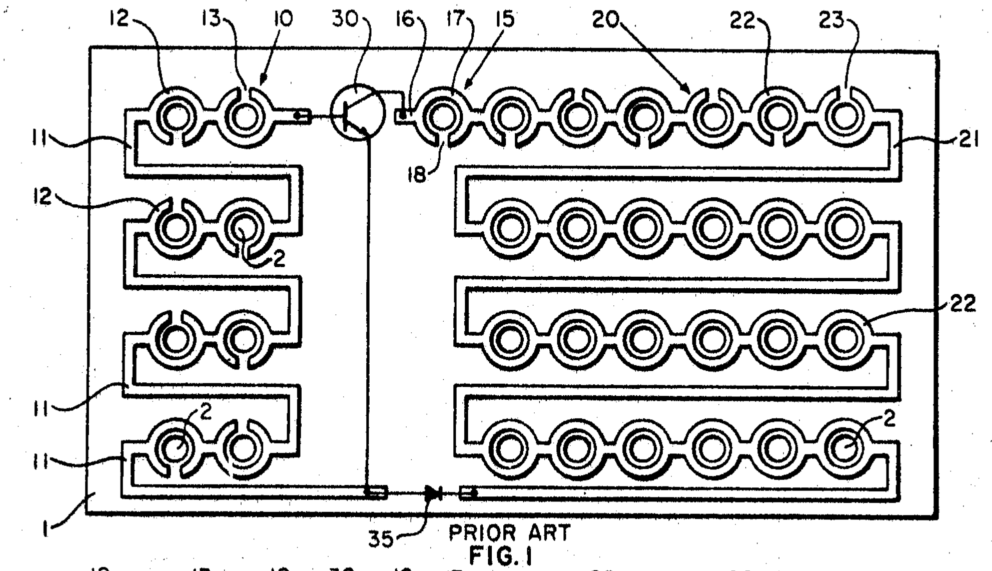
PRIOR ART FIG. 1
FIG. 1 is a schematic representation of a data plane of the prior art, shown partially encoded.

The prior art of FIG. 1 shows a solenoid array data plane of the connectionless type comprising a substance plane of the connectionless type comprising a substrate 1 having a plurality of apertures 2 therein, and carrying an address portion 10 including conductor 11 and minor loops 12, a drive portion 15 including conductor 16 and minor loop 17, and a storage portion 20 including conductor 21 and minor loops 22. The minor loops 12, 17 and 22 are encoded adjacent each aperture to encircle their respective solenoids (not shown) in one direction or the other. The address major loop comprises conductor 11 connecting minor loops 12 in series with the base-emitter circuit of transistor 30. The storage major loop comprises minor loops 17 and 22 connected in series with the collector-emitter circuit of transistor via conductors 16 and 21 and diode 35.

Figure 8:
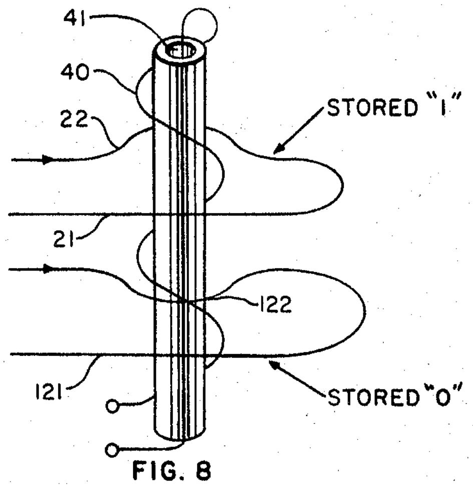
FIG. 8 is a schematic representation of the bipolar coding technique.

Encoding of the data plane is generally performed by scraping or punching away portions of the conductive patterns of loops 12, 17 and 22 to include within (or exclude from) the solenoids their respective major loops as shown by references 13, 18 and 23 and thereby selectively encircle the solenoids in one direction or the other. Your attention is invited to FIG. 8 which shows the storage portions of two, one-bit data planes 21–22 and 121–122 and a sense solenoid 40 carried on a support 41. It can be seen that like currents in the major loops of these planes will cause opposite polarity output signals at the terminals of solenoid 40.

Figure 2:
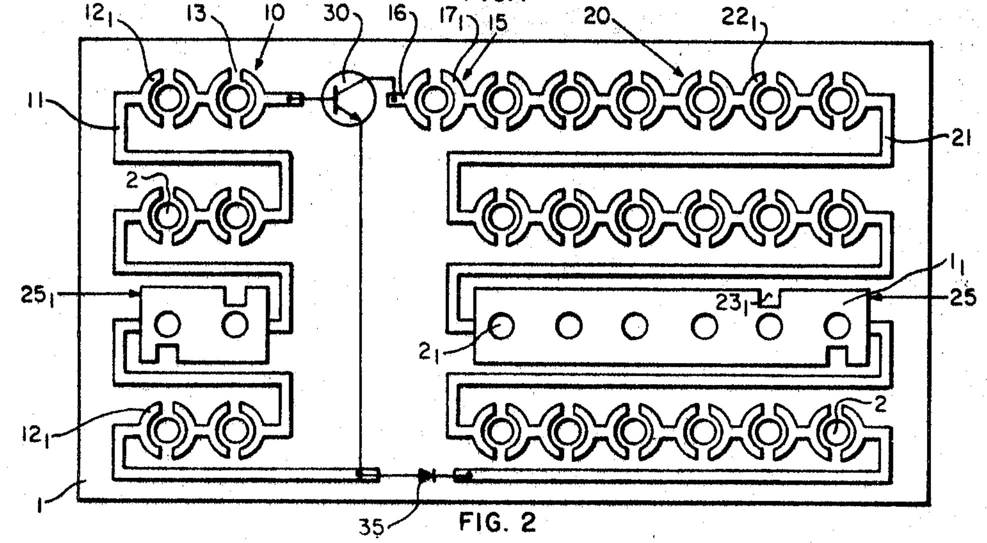
FIG. 2 is a schematic representation of an embodiment of the invention showing a data plane master and two code strips in place.
Figure 3:
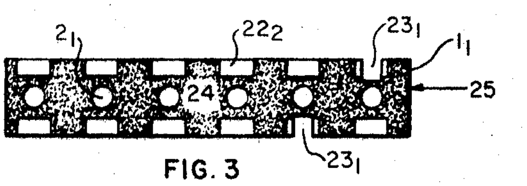
FIG. 3 is an illustration of a code strip master for use with the data plane master of FIG. 2, shown partially encoded.

Referring to FIGS. 2 and 3, an embodiment of the invention is shown wherein a master data plane comprises a substrate 1 having a plurality of apertures 2 therein. The data plane also comprises an address portion 10, a drive portion 15 and a storage portion 20 which are similar to the corresponding portions of FIG. 1. However, the minor loops $\mathbf{12_1}$, $\mathbf{17_1}$, and $\mathbf{22_1}$ are all incomplete loops. The coding strip 25 of FIG. 3 is employed to selectively complete the minor loops and comprises an adhesive backed substrate 1, having apertures $\mathbf{2_1}$ therein sized and spaced to align with apertures 2 for accepting the solenoid array. The coding strip carries shorting bars $\mathbf{22_2}$ to complete the gaps of the incomplete loops $\mathbf{12_1}$, $\mathbf{17_1}$, or $\mathbf{22_1}$. Selective encoding is accomplished by any of the well-known masking, etching, scraping or punching techniques to provide selective encirclement of the respective solenoids. The punching technique will produce a gap in the shorting bars $\mathbf{22_2}$ as referenced by character $\mathbf{23_1}$. The encoded strips have an adhesive applied to the open areas and are then inverted and pressed into place on the master data sheet as shown in FIG. 2. Other strips, such as $\mathbf{25_1}$, may be employed for the address section. Likewise, the drive section may be encoded on the same strip of a data word if in line therewith, or may be separately encoded by a similar strip or strips if more than one drive solenoid is employed, as discussed in United States patent application, Ser. No. 466,956, filed June 25, 1965 and assigned to the same assignee as the present invention.

Another method of arriving at the embodiment of FIGS. 2 and 3 involves affixing the shorting bars to the code strip which already has an adhesive backing.

Figure 4:
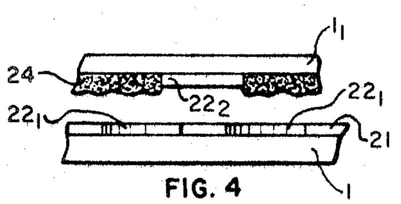
FIG. 4 is an exploded side view of a portion of a data plane according to FIGS. 2 and 3 showing the mating of the data plane and the code strip.

FIG. 4 shows an exploded side view of portions of a data plane assembly wherein an adhesive is applied to the substrate $\mathbf{1_1}$ in the areas not covered by the shorting bars $\mathbf{22_2}$.

Figure 5:
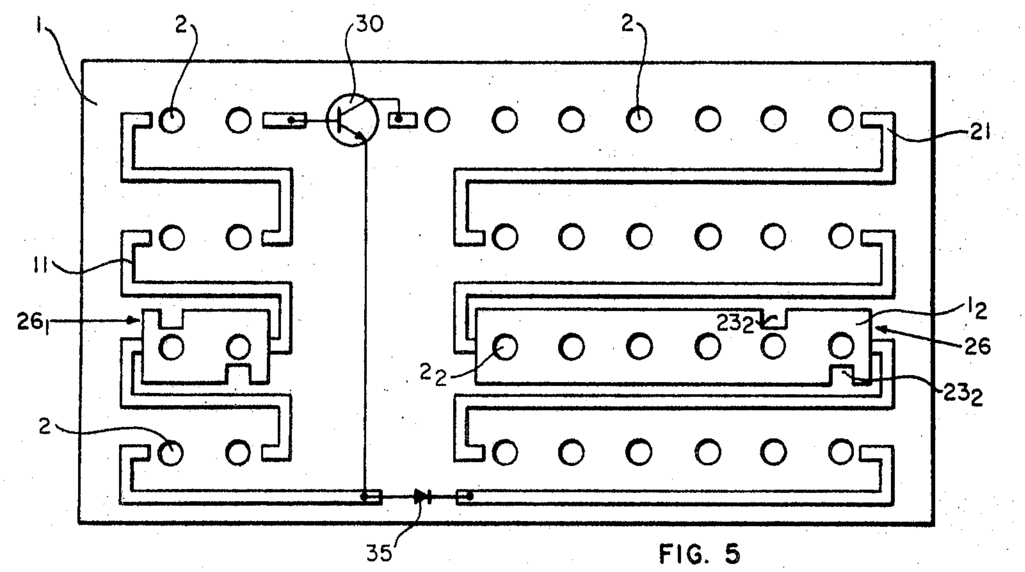
FIG. 5 is a schematic representation of another embodiment of the invention showing a data plane master and two code strips in place.
Figure 6:
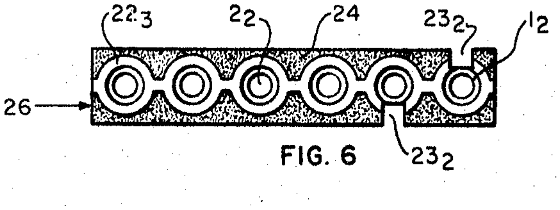
FIG. 6 is an illustration of a code strip master for use with the data plane master of FIG. 5, shown partially encoded.

Referring to FIGS. 5 and 6, another embodiment of the invention is shown wherein the master data plane carries only the interconnecting conductors, such as conductor 21. The adhesive-backed code strip 26 comprises complete loops $\mathbf{22_3}$ about the apertures $\mathbf{2_2}$. The strip is encoded by selectively removing conductive material as mentioned above to provide gaps $\mathbf{23_2}$. The code strips are pressed into place on the data plane, as shown in FIG. 5. Strip $\mathbf{26_1}$ shows that the address section may also be coded in this manner.

In each of the foregoing embodiments, a word may be changed by peeling off a code strip and replacing it with a code strip of different data content.

Figure 7:
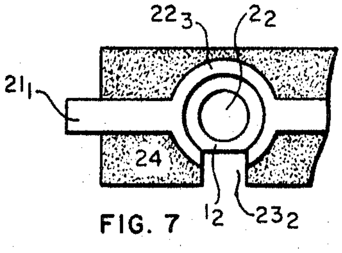
FIG. 7 is an illustration of a variation of the code strip of FIG. 6.

The above data sheet and code strip masters require that the conductors be gold flashed to prevent oxidation thereof. FIG. 7 describes a code strip construction which has a metal tab $\mathbf{21_1}$ extending from each end of the substrate. This tab may be soldered or welded to conductor 21 of a data plane and thereby eliminate the need of the gold flash process.

The techniques disclosed herein may also be applied to data planes which are not of the connectionless card type. Such data planes comprise only the storage portion of the data planes illustrated herein, the major loop of said storage portion being connected to and driven by the electronic driving apparatus of the data system.

Changes and modifications of the invention may be made by those skilled in the art without departing from the spirit and scope of the invention.

We claim:

1. An alterable data plane for a mechanically alterable memory comprising:

a sheet of insulating material having a plurality of apertures therein arranged in like groups in a predetermined configuration, a pattern of discontinuous conductors disposed on one surface of said sheet in proximity with said apertures, and a plurality of coding strips, one for each of said groups, removably secured to said sheet, said strips being formed of insulating material and each having a plurality of apertures therein aligned with corresponding apertures of its respective group in said sheet, and having a conductive pattern on the surface thereof confronting said sheet arranged to bridge the discontinuities in the conductors on said sheet to form a continuous conductor having a plurality of serially connected partial loops selectively extending around one side or the other of the apertures of its respective group.

2. A data plane according to claim 1 wherein the conductive pattern on said sheet comprises a plurality of interconnected conductive loops, each of said loops encircling one of said apertures and having a pair of gaps to make it discontinuous at diametrically opposite points of its respective aperture, and wherein the conductive pattern on said strip comprises a plurality of bridging conductors arranged in a pattern to bridge selectively one or the other of the gaps in each of said loops.

3. A data plane according to claim 1 wherein the apertures constituting each group are arranged in rows, and said pattern of discontinuous conductors comprises a plurality of conductors for connecting a loop at one end of each row of apertures to a loop at the other end of the next adjacent rows of apertures, and wherein the conductive pattern on said strip comprises a plurality of serially connected conductive loops each encircling a respective aperture in said strip, and a portion of each of said loops on one or the other side of its corresponding aperture is selectively removed.

References Cited

UNITED STATES PATENTS

| | | | |
|---|---|---|---|
| 2,603,716 | 7/1952 | Low | 179—18 |
| 3,380,039 | 4/1968 | Pick | 340—174 |

STANLEY M. URYNOWICZ, Jr., Primary Examiner

U.S. Cl. X.R.

174—68; 317—101; 339—19, 31